UNITED STATES PATENT OFFICE.

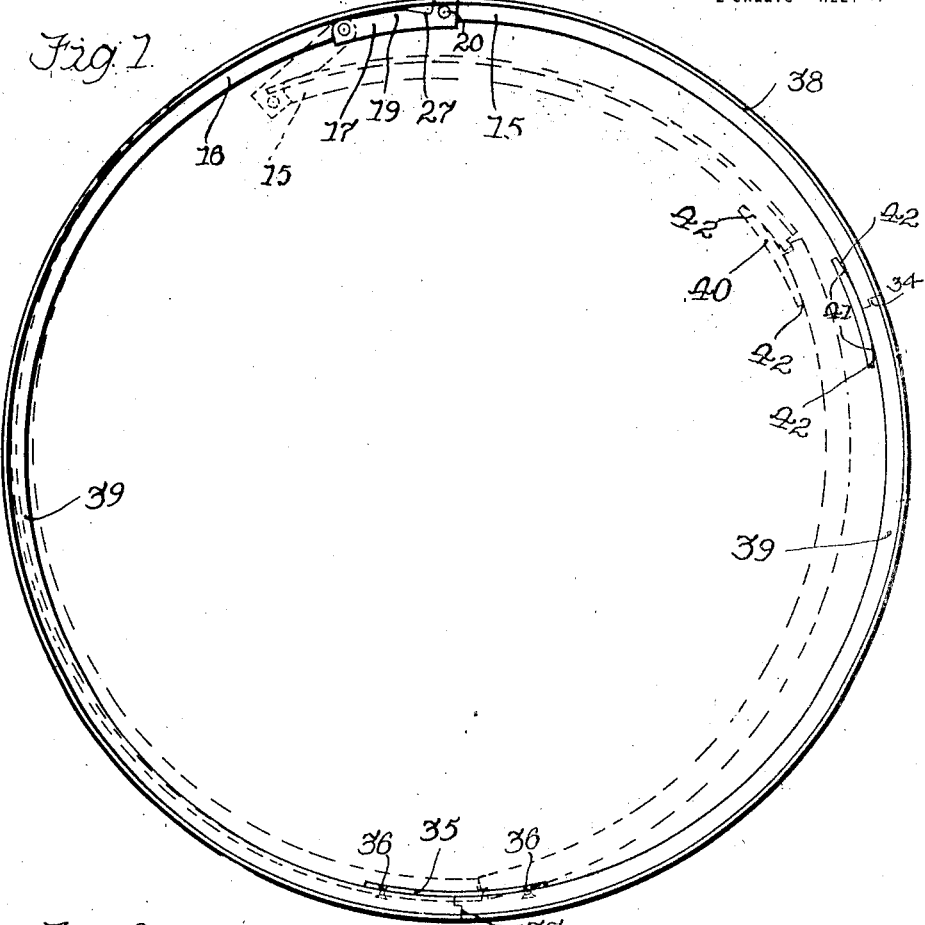
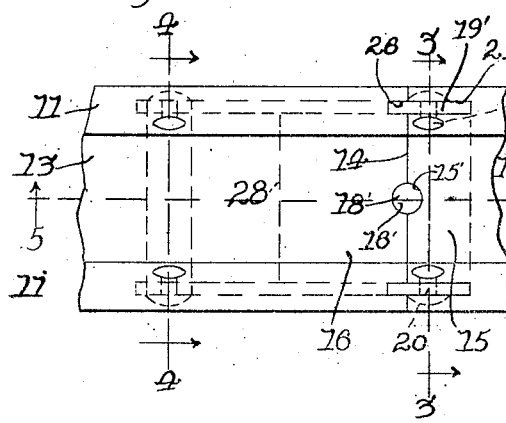

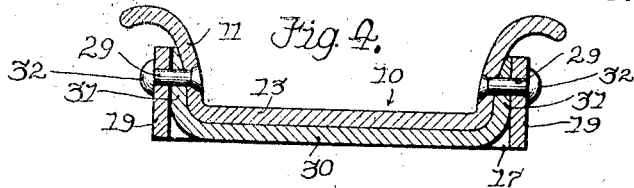
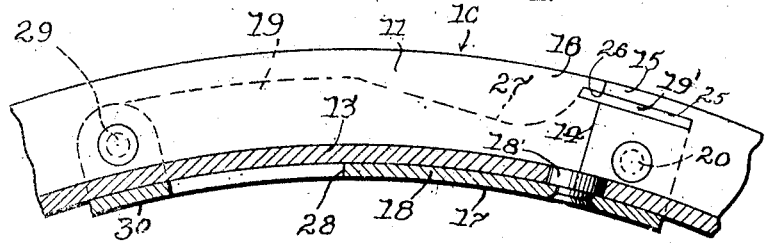
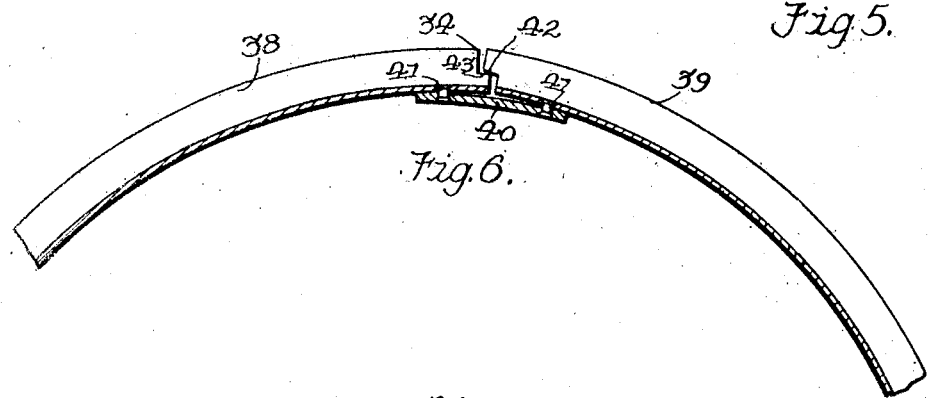
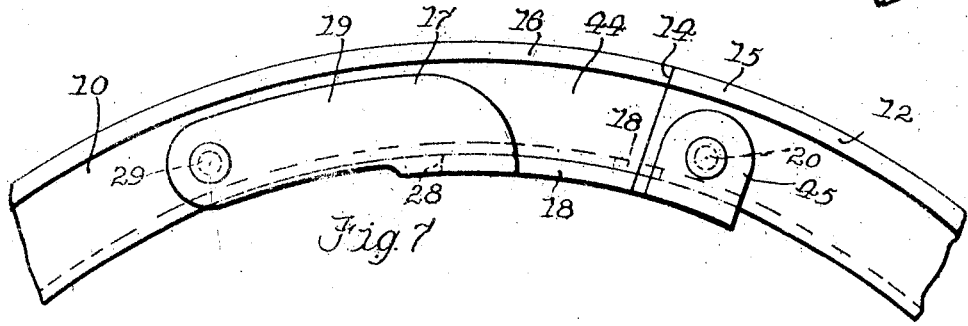
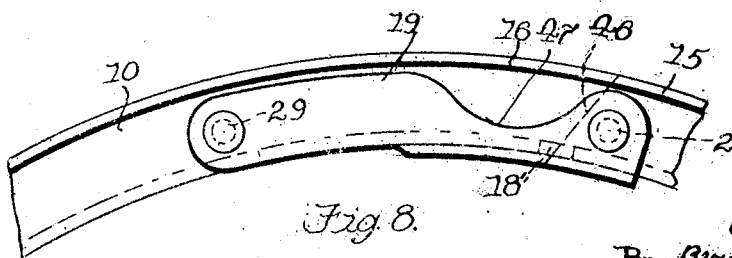

CHARLES B. DEEDS, OF SAVANNA, ILLINOIS, ASSIGNOR, BY MESNE ASSIGNMENTS, TO LIGHTNING CHANGE RIM CORPORATION, OF BERRIEN SPRINGS, MICHIGAN, A CORPORATION OF MICHIGAN.

COLLAPSIBLE RIM.

1,322,096.      Specification of Letters Patent.      Patented Nov. 18, 1919.

Application filed January 8, 1919. Serial No. 270,106.

*To all whom it may concern:*

Be it known that I, CHARLES B. DEEDS, a citizen of the United States, residing at Savanna, in the county of Carroll and State of Illinois, have invented a certain new and useful Improvement in Collapsible Rims, of which the following is a full, clear, concise, and exact description, reference being had to the accompanying drawings, forming a part of this specification.

My invention relates to improvements in rims for pneumatic and similar tires and has special reference to rims which are provided with integral flanges for engaging and holding the tires.

The casings of many pneumatic tires and most solid rubber tires have bases which are substantially inexpansible and the object of my invention is to provide a flanged rim which can be readily collapsed within its normal dimensions to permit the rim to be placed within a tire of the above character and then expanded to properly seat the tire on the rim.

A further object is to provide a collapsible rim which can be collapsed and expanded quickly and easily without tools; which shall not have separable parts; which shall be cheap to manufacture; and which shall consist of the usual stock or standard flanged rim section with certain added plates or parts for linking the ends together, or holding them in registry and for use in forcibly collapsing and expanding the rim.

Many attempts have been made to produce a practical collapsible rim, the most successful of which has apparently been a one-piece split rim having interlocking parts at the ends of the rim for holding the ends in proper registry when the rim is expanded within a tire. This form has proven fairly satisfactory when made in the lighter weight sections, but as the tires become larger and heavier and the rims follow suit, a single piece rim becomes more and more difficult to collapse. I preferably, though not necessarily, split my rim at more than one point so as to facilitate its collapse and I provide a rim joining member for linking the ends together, for holding them in register and for use in forcibly collapsing the rim. The means which I employ for connecting the ends of the rim does not offer any objectionable obstruction to the placement of the rim upon a wheel, and it strengthens and interlocks the ends and it serves as an effective power lever for forcing the rim to a completely collapsed condition, as well as assisting in the expansion of the rim within the tire. While I have produced my improved rim primarily for the heavier tires, I find that lighter weight rims made in accordance with my invention prove practical and valuable.

In order that those skilled in the art may fully comprehend my invention, attention is directed to said drawings in which:

Figure 1 is a side elevation of a flanged rim embodying my invention in one form.

Fig. 2 is a fragmentary inner plan view of the linked ends of the rim;

Figs. 3 and 4 are transverse sectional views of the rim on the lines 3—3 and 4—4 of Fig. 2;

Fig. 5 is a fragmentary longitudinal section of the rim on the line 5—5 of Fig. 2;

Fig. 6 is a fragmentary central section of the rim showing one of the limited movement joints; and Figs. 7 and 8 are fragmentary side elevations of the linked ends of the rims showing modified structures.

In said drawings 10 is a rim shown as provided with radial flanges 11 at its side edges for engaging and holding the base of a pneumatic tire casing in a well known manner.

The flanges are curved outwardly at their edges 12 thus forming a rim to receive the well known Dunlop form of casing. The web 13 of the rim is flat, in section, as best shown in Figs. 3 and 4, or straight cylindrical, and is adapted to be secured upon a wheel by any of the well known methods.

The flanges 11 being integral with the web 13 and the base of the tire to be used with the rim being substantially inexpansible, as usually made, I cut or split the rim at one point 14 preferably by a straight radial cut across the rim so that I can spring or collapse one end 15 of the rim within the adjacent end 16, as shown in dotted lines in Fig. 1, so as to collapse the rim as a whole to dimensions substantially within the circumference of the web 13 for entering the rim within the tire or removing it from the tire. For holding the ends 15 and 16 of the rim rigidly interlocked and in alinement, and for forcibly collapsing and expanding the rim, I provide a channel shaped link or link member 17 having a web or body 18 and side flanges 19. This channel shaped link 17 embraces the rim with the web 18 lying flat against the inner cylindrical surface of the rim and spans the split 14 therein, as best shown in Fig. 5. The flanges 19 project outwardly and lie substantially parallel with the flanges 11 of the rim. I arrange the link member 17 with one end overlapped onto the end 15 of the rim far enough so that I can pivotally connect the flanges 19 of the link member 17 to and upon the flanges 11 of the rim by pivot pins 20. I preferably mount these pivot pins rigidly in the flanges 11 of the rim 10, their outer ends 21 adapted to receive the flanges 19 of the link member which I provide with holes 22 for this purpose.

I provide the pins 20 with shoulder collars 23 to fill in between the inner sides of the flanges 19 which I preferably arrange with their outer surfaces and their radial inner surfaces inclined as shown to conform with the inclination of the flanges of the rim. The shoulders 23 contact with the outer surface of the flanges 11 and I rivet the inner end of the pin to secure it in the rim. I rivet over the outer ends of the pins to form heads 24 to loosely engage the flanges 19 of the link 17 and permit the link to swing freely on the pins.

For transversely interlocking the flanges 11 of the rim at the cut 14 I provide the ends 15 and 16 of the rim with registering circumferentially extending slots 25 and 26 adapted to receive the outer ends 19' of the flanges 19 of the link 17 when the rim is in expanded condition. The slots 25 serve to receive the side flanges 19 when the rim is collapsed. To permit the complete collapsing or opening of the rim I cut away the flanges 19 as shown at 27 to clear the ends of the slots 25 as best shown in Fig. 1 in dotted lines.

As a further means of doweling the ends 15 and 16 together I provide registering notches 15' and 16' in the two ends of the rim in the web 13 and I provide a projection 18' on the web 18 of the link 17 to enter said notches.

For the purpose of providing ample clearance for the web portion of the end 16 of the rim I cut away the web part 18 of the link 17 at its rear end as shown at 28, the two flanges 19 extending along the rim to a point distant from the cut 14 sufficient to cause a proper collapsing of the rim. I pivotally connect the link 17 on the end 16 of the rim at a distance from the cut 14 by rivets 29 which extend through the flanges 11 and 17 and parallel with the pivots 20. As shown in Fig. 4 I secure the pivots in the flanges of the rim and I provide a filler strap 30 which I extend across the rim at this point. The ends 31 of the filler strap are tapered or wedge shaped to compensate for the inclination of the flanges 11 of the rim and the flanges 19 of the link contact with their outer surfaces and are held in place by heads 32 which are formed on the outer ends of the pivots.

It should be understood that the outer ends of the pivots need not necessarily be provided with heads as the link 17 cannot get out of place once the pivots are set.

In rims of light section, the one cut 14 is sufficient, as the rim itself can yield sufficiently to permit its collapse.

In rims of heavier section I preferably cut the rim at a point 33 diametrically opposite the cut 14 and cut it at a third point 34 preferably less than a quarter of the circumference from the end 15, thus forming three sections 37, substantially a half circle 38, less than a quarter circle, and 39 more than a quarter circle. I permanently join the rim ends at these two cuts by means which permit the rim ends to separate slightly. At the cut 33 I preferably join the ends by means of a thin plate 35 which spans the split and lies flat against the inner surface of the web 13 of the rim, being permanently connected at its end by rivets 36. This plate is somewhat yielding so that as the rim is collapsed the outer edges of the flanges at the cut 33 can open up to some extent as shown in dotted lines in Fig. 1. The plate 35 yields to some extent and to some extent serves to cause the flexing of the half circle section 37 of the rim, as shown in dotted lines. At the cut 34 I provide a limited movement hinge which permits the free collapse or inward movement of the section 38 of the rim and then becomes rigid and the further inward movement of the section 38 forcibly draws the section 39 inwardly and causes the inward flexing of the section 37.

This limited hinge device comprises a link plate 40 which lies against the inner cylindrical surface of the web 13 of the rim and spans the split 34. The ends are loosely riveted to the web of the rim by the rivets 41 and the two ends of the contacting face of the plate are cut away making the ends wedge-shaped and providing spaces 42 to permit the relative inward movement of the two parts of the rim until stopped by contacting with said wedge surfaces and the heads of the rivets 41. Thereafter the hinge is rigid with the two parts of the rim and the further inward movement of the part 38 causes the inward movement of the section 39 and the half section 38.

I preferably form the cuts 33 and 34 as shown, offset for a short distance circumferentially of the flanges 11 to provide radial contacting shoulders 42 and 43 as best shown in Fig. 6 for radially interlocking the ends of the rim parts at said cuts.

In some forms of rims and fasteners the doweling of the rim at the cut 14 by means of the dowel projection 18' is sufficient without the interlocking of the flanges 19 of the link 17 with the flanges 11 of the rim and in Fig. 7 I have illustrated a form of link connection in which I have eliminated interlocking of the flanges and the slots 25 and 26. In this form I cut away the flanges 19 of the link 17 as at 44 to permit the flanges 11 of the end 15 of the rim to pass the link 17 when the rim is collapsed and providing the link 17 with radially extending projections 45 for receiving the pivot pins 20. I make the projections 45 short enough so that they lie within the outer edges of the flanges 11. The separated flanges 19 at the rear end of the link 17 in the form shown in Fig. 7 are curved inwardly and are joined to the rear end of the web portion 18, the web being cut away at its rear end as in the former instance for clearing the web of the rim when the rim is collapsed.

In Fig. 8 I have shown a form of connecting link and rim cut whereby I am enabled to preserve considerable of the flanges 19 of the link 17 where they are cut away for clearing the end 15 of the rim. In this form, instead of making the cut of the rim a radial cut I make an inclined cut 46 making the outer part of the flanges 11 of the end 15 shorter than the inner parts. In other words, I cut back flanges 11 over the pivots 20 on the end 15 thus providing part of the necessary clearance and I provide the rest of the clearance by notching the flanges 19 of the links 17 at 47 similar to the notches 27 in the form shown in Fig. 1. I provide this form of connection with the dowel projection 18' for transversely doweling the ends 15 and 16 of the rim.

The link 17 acts as a very powerful lever both for collapsing the rim and for expanding it again, and as the pivots 20 are radially beyond the line joining the pivots 29 and the cut 34 of the rim, when the rim is expanded the pressure of the tire cannot cause the collapse of the rim.

In collapsing the rim it is merely necessary to give the tire a sharp radial blow as by dropping the tire a short distance to the floor causing it to strike at a point adjacent to the pivots 20 or slightly toward the cut 34 from said pivots when the end 15 of the rim will snap within the rim. Thereafter a slight pressure by the foot upon the swinging end of the link 17 easily forces the link to the completely collapsed position shown in dotted lines in Fig. 1. In expanding the rim the link 17 swings readily to nearly the fully expanded position and thereafter a slight pressure by the foot upon the link readily forces the link and the rim to the fully expanded position.

It will be obvious that the link 17 acts as a powerful toggle lever both in expanding and collapsing the rim.

My improved rim can be manufactured very cheaply and when fully expanded it is exceedingly rigid being substantially equal to an uncut rim.

As many modifications of my invention will readily suggest themselves to one skilled in the art I do not limit my invention to the specific structures herein shown and described except as indicated by the appended claims.

I claim:

1. In a tire rim having integral substantially radial tire engaging flanges, the rim having a transverse split at one point, a channel shaped member within the rim having edge flanges parallel with the flanges of the rim, and spanning said split, one end of the member at opposite sides pivoted to the flanges of one end of the rim adjacent to said split and the opposite end pivotally connected to the flanges of the opposite end of the rim at a distance from the split, the flanges of said member spanning the cut in the rim, the adjacent ends of the rim flanges having registering slots for receiving the flanges of said connecting member for transversely doweling the ends of the rim.

2. In a tire rim having integral substantially radial tire engaging flanges, the rim having a transverse split at one point, a channel shaped member within the rim having edge flanges parallel with the sides of the rim and spanning said split, one end of the flanges at opposite sides pivoted to the flanges of one end of the rim adjacent to said split and the opposite end pivotally connected to the flanges of the opposite end of the rim at a distance from the split, the flanges of said member spanning the cut in the rim, the adjacent ends of the rim flanges having registering slots for receiving the flanges of said connecting member for transversely doweling the end of the rim and the adjacent parts of the flanges cut away to permit the complete collapse of the rim.

3. In a tire rim having integral substantially radial tire engaging flanges, the rim having a transverse split at one point, a channel shaped member within the rim having edge flanges parallel with the flanges of the rim, and spanning said split, one end of the flanges at opposite sides pivoted to the flanges of one end of the rim adjacent said split, and the opposite ends pivotally connected to the flanges of the opposite end of the rim at a distance from the split, the web of said connecting member cut away adjacent to said last mentioned pivots and the flanges of said connecting member having notches in their edges adjacent to said first mentioned pivots to permit the collapsing of the rim.

4. In a tire rim having integral substantially radial tire engaging flanges, the rim having a transverse split at one point, a channel shaped member within the rim having edge flanges parallel with the flanges of the rim and spanning said split, one end of the flanges at opposite sides pivoted to the flanges of one end of the rim adjacent to said split and the opposite ends pivotally connected to the flanges of the opposite end of the rim at a distance from the split, the adjacent ends of the rim having registering notches in the web portion thereof, and a dowel on the web of said connecting member engaging in said registering notches for transversely doweling the ends of the rim.

5. A tire rim having integral side flanges which extend out laterally, said rim cut apart at one point in its circumference forming inner and outer overlapping flange parts, a flanged rim end connecting member embracing the rim at the cut, pins pivotally connecting the flanges of said member to the flanges of the rim, said pins positioned at the projecting inner end of said rim flanges, the opposite ends of the flanges of the connecting member pivoted to the flanges of the opposite end of the rim at a distance from said cut end.

6. A tire rim having integral side flanges which extend out laterally, said rim having an inclined cut at one point in its circumference forming inner and outer overlapping flanged parts, a flanged rim end connecting member embracing the rim at the cut, pins pivotally connecting the flanges of said member to the flanges of the rim, said pins positioned at the projecting inner end of said rim flanges, the opposite end of the flanges of the connecting member pivoted to the flanges of the opposite end of the rim at a distance from said cut end, the web of said connecting member cut away at one end and the flanges cut away at the opposite end to clear the two ends of the rim when the rim is collapsed.

7. In a tire rim having integral tire engaging side flanges, the rim cut into three sections, one of said sections being substantially a half circle and another of said sections being less than a quarter circle, a channel shaped link member embracing the rim at the adjacent ends of said two sections and pivot pins pivotally connecting the flanges thereof to the flanges of said sections, and plates within the rim at the two other cuts, said plates permitting a limited inward movement of the several sections and formed to cause a distortion of the rim upon a further inward movement of the linked section.

8. A tire rim having integral radial tire engaging flanges, the rim cut apart at three points forming substantially a half rim section and two smaller sections, plates joining the rim at two points permitting the rim to give inwardly at said points a limited distance and a link member embracing the rim at the other point having flanges substantially parallel with the flanges of the rim, means pivotally connecting one end of the linked member to the flanges of one of the shorter sections adjacent to its end, means pivotally connecting the flanges of the link member to the half rim section at a distance from its adjacent end, the inner part of said link member cut away to permit the linked end of the shorter section to swing within the adjacent end of the longer section, and a dowel pin on said plate for doweling the adjacent ends of the sections.

9. A tire rim having integral side flanges for engaging a tire, the rim cut apart at more than one point, plates within the rim at all but one of the cuts permanently connecting the rim parts and permitting the parts to swing inwardly freely a limited distance, a connecting member at the other point having radial flanges at its edges embracing the flanges of the rim, means pivotally connecting the flanges of said connecting member to the flanges of the rim adjacent to the end of one of said sections and spaced from the adjacent end of the other section, the inner part of said connecting member cut away at one end to permit the complete collapse of the rim, a dowel carried by said member and entering registering notches in the adjacent ends of said sections for transversely interlocking said sections, said plate connection adapted to cause a distortion of the several parts of the rim when the rim is collapsed to its limit.

In witness whereof I hereunto subscribe my name this 6th day of January A. D. 1919.

CHARLES B. DEEDS.